United States Patent Office 3,011,916
Patented Dec. 5, 1961

3,011,916
METHOD OF MARKING PERFLUOROCARBON RESIN SURFACES
William Andrew Nicoll, Wilmington, Del., assignor to E. I. du Pont de Nemours and Company, Wilmington, Del., a corporation of Delaware
No Drawing. Filed Nov. 21, 1958, Ser. No. 775,386
2 Claims. (Cl. 117—138.8)

This invention relates to improvements in marking perfluorocarbon resin surfaces with identification indicia, and more especially, in marking surfaces of articles, such as wire insulated with a polytetrafluoroethylene resin, with color-coding stripes which have properties of resisting heat, abrasion, and solvent action.

It is impractical to mark perfluorocarbon resin surfaces by ordinary techniques because of the well-known anti-adhesive character of such surfaces, by reason whereof conventionally applied markings are easily rubbed off. It has, however, hitherto been found possible to mark such surfaces by a special method, which involves applying a pigmented aqueous codispersion of polytetrafluoroethylene and an auxiliary heat-fugitive resin, and thereafter heating to drive off the auxiliary resin and achieve an adherent mark. Codispersions of this kind are disclosed in Hochberg U.S. Patent 2,681,324, issued June 15, 1954. In using this method, nevertheless, difficulties have been experienced in achieving well-delineated uniform markings, and, moreover, long expensive heating treatments have been required in order to achieve satisfactory adherence as judged by abrasion resistance tests.

It is a general object of the present invention to provide an improved procedure for marking perfluorocarbon resin surfaces. Other objects will be apparent hereinafter.

According to the present invention the aforesaid objects are achieved by a process which comprises applying to a perfluorocarbon resin surface an ink formulation consisting essentially of heat-resistant pigment, codispersed with an equal or greater weight of an hexafluoropropylene/tetrafluoroethylene interpolymer having a crystalline melting point in the range of 242 to 305° C., in a volatile liquid medium which forms a contact angle in the range of 10 to 55° with the fluorocarbon resin surface, and heating the applied formulation at a temperature in the range of 450 to 950° C.

The pigment component of the ink formulation may comprise in general, any heat-resistant pigment such as carbon black, phthalocyanine, or inorganic oxide, which can withstand the exposure to elevated temperatures without damage. Examples are National Blue #10034, a product of B. F. Drakenfield, New York, New York; Green F–9653, Orange F–5895, Red F–5893 and Black F–2302, products of the Ferro Corporation, Cleveland, Ohio; and Chrome Yellow medium Y–661–DR, "Ti-Pure" 510 titanium dioxide white, "Monastral" fast blue BFP paste, and "Lithosol" fast yellow 36D, RMM and 4RNL paste, products of E. I. du Pont de Nemours & Company, Wilmington, Delaware. It is important for best results that the pigments be used in a very finely divided form.

The resin component of the ink formulation may comprise perfluorocarbon interpolymers of tetrafluoroethylene and hexafluoropropylene having crystalline melting points in the range of 242 to 305° C. Interpolymers having melt viscosities in the range of $1.5 \times 10^3$ to $3 \times 10^5$ poises as measured at 380° C. under a shear stress of 6.5 pounds per square inch are preferred. Such polymers may be obtained by polymerizing mixtures containing hexafluoropropylene and tetrafluoroethylene in weight ratios of 3:7 to 9:1 respectively, in the presence of an aqueous solution of a free radical initiator. The especially preferred resins are those having a crystalline melting point in the ange of 256 to 287° C. and a melt viscosity in the range of $3 \times 10^4$ to $1 \times 10^5$ poises. It is also important that the perfluorocarbon resin be in finely divided form for best results.

The liquid component of the ink formulation may be any volatile liquid in which the solid components can be dispersed which forms a contact angle in the range of 10 to 55° with the perfluorocarbon resin surface to be marked. Liquids having a boiling point in the range of 80° to 200° C. and a density above one are preferred. Tetrachloroethylene is especially preferred. Examples of other liquids which may be used include hexane, toluene, xylene, chlorobenzene, acetone, methanol, ethyl acetate, and water containing sufficient abluent to afford the required contact angle. Liquids which form a higher contact angle yield non-uniform markings.

The ink formulation may be conveniently prepared by milling the components together until the solid components are sufficiently finely divided, e.g. to a particle size of less than 5 microns, to remain adequately dispersed in the liquid during its use or to be kept dispersed by agitation during use. In general, the quality of the ink formulation improves with the degree of subdivision of the solid components.

It is essential, if even fair abrasion resistance is to be achieved, that the total quantity of solids in the ink formulation include at least 50 weight percent of the resin component. The especially preferred formulations are those based on high density liquids such as perchloroethylene, containing 12–16 weight percent total solids of which 5–15 weight percent is pigment and the balance is resin. Alternative formulations based on lower density liquids such as xylene preferably contain 5–10 weight percent total solids of which 15–30 weight percent is pigment and the balance is resin.

The ink may be applied by brush, swab, stamp, roller, or other conventional apparatus to the fabricated perfluorocarbon resin surface to be marked. For spiral striping of wire, an Entwistle Type G Tape and Spiral Marking Machine, a product of the James L. Entwistle Company of Cranston, Rhode Island, is effective. Special pretreatment of the perflorocarbon resin surface is not essential. However, for best results in achieving precise delineation and uniformity of the final mark, the resin surface may be slightly roughened. It is important that the roughening be slight and uniform, since either too great a degree of roughness or non-uniform roughness may adversely affect printability. An effective means of suitably roughening tubing or wire insulation is to subject it to the abrasive action of 140-mesh quartz particles in a water jet. The "Liquamatte" machine, a product of the American Wheelabrator and Equipment Corporation of Mishawaka, Indiana, is effective for this purpose. The slight roughening thus achieved reduces the contact angle of the ink with the surface being marked. Alternatively, the perfluorocarbon resin surface may be preliminarily coated with a thin film of ordinary cup grease or axle grease, which also improves the printability of the surface, and is removed during the subsequent heat treatment.

Following application of the ink, drying and fixing of the mark may be accomplished by heating at a temperature in the range of 450 to 950° C. for from 2.5 to 32 seconds. The optimum time and temperature within this range are interdependent, and will vary with the gel temperature of the perfluorocarbon surface being marked. In fixing marks on the surfaces of perfluorocarbon resins which gel at temperatures in the range of 305 to 327° C. a minimum time such that $\log t = 1.8952 - 0.001422T$, where $t$ is the heating time in seconds and $T$ is the temperature in ° C., is effective to achieve an abrasion-resistant mark, and a time such that $\log t = 2.1937 - 0.001530T$ should not be exceeded, since longer exposure may adversely affect substrate quality. Similarly, in fixing marks on the surfaces of perfluorocarbon resins which gel at temperatures in the range of 270 to 305° C., a minimum time such that log $t=1.6936-0.00136 3T$ is effective, and a time such that log $t=1.909-0.001340T$ should not be exceeded. Thus a heating time of 18 to 32 seconds at 450° C. or 3.5 to 5.5 seconds at 950° C. is effective in fixing a mark on the surface of polytetrafluoroethylene resin (gel point 327° C.), and a time of 12 to 20 seconds at 450° C., or 2.5 to 4.5 seconds at 950° C. is effective in fixing a mark on the surface of a melt extrudable perfluorocarbon resin having a gel point of about 285° C.

It will be understood that as a practical matter the overall rate at which a continuous mark can be applied to a continuous article such as wire is a function of the length of the oven available. The oven is preferably vertical to avoid smearing the mark before it becomes fixed. However, the expense of building an oven more than about 30 feet high is ordinarily unacceptable. On the basis of a 30-foot vertical oven, the process of the present invention makes it possible to apply a permanent stripe to wire at speeds in the vicinity of 200 feet per minute or more and spiral striping may be carried out at speeds of 100 feet per minute or more, depending upon the capacity of the apparatus used to apply the stripe for fixing.

The invention is more particularly described and explained by means of the following comparative and illustrative examples showing use of various ink formulations to apply a spiral stripe to hook-up-wire, a seven-strand AWG-22 wire insulated with a 10 mil coating of perfluorocarbon resin. In the examples all parts are by weight except as indicated, the marks were applied by means of the Entwistle Type G Tape and Spiral Marking Machine previously mentioned, and the marks were fixed by the exposure indicated passing the wire upwardly through a 9-foot vertical oven of insulated, electrically heated, 2-inch diameter pipe. The abrasion resistance reported is the number of strokes required to remove the mark, measured on a Repeated Scrape Tester (General Electric Company, Schenectady, New York) using a 500 gram load on a cylindrical needle 0.025 inch in diameter.

EXAMPLE I

A cylindrical vessel of 230 parts water capacity was one-third filled with ⅛ inch steel balls and further charged with 1.5 parts of phthalocyanine blue pigment, 70 parts of perchloroethylene, and 28.5 parts of interpolymeric hexafluoropropylene and tetrafluoroethylene in the form of powder having a crystalline melting point of about 285° C. and a melt viscosity of about $8 \times 10^4$ poises as measured at 380° C. under a shear stress of 6.5 pounds per square inch. The vessel was sealed, rolled for 24 hours and decanted to obtain a stable ink formulation. Spiral stripes of the ink formulation were applied at room temperature to wire insulated with polytetrafluoroethylene and then exposed to a temperature of 685° C. for various times. The marks were of good uniformity and definition. Further results are given in Table I, in which these samples are designated by the letter A.

EXAMPLE II

A spiral stripe of a commercial ink, formulated of aqueous colloidal polytetrafluoroethylene, wetting agent, codispersed polyisobutylene and red inorganic oxide pigment, the formulation having a density in the range of 1.2 to 1.3, was applied at room temperature to wire insulated with polytetrafluoroethylene and then subjected to a temperature of 650° C. for 13.5 seconds. The mark obtained was non-uniform and of irregular definition. It was easily rubbed off with the fingers, and cracked off when the wire was flexed.

EXAMPLE III

Ten parts of the formulation of Example II were diluted with 8 parts of water and 0.1 part of ammonium perfluorocaprylate to reduce contact angle and obtain a formulation forming a contact angle of less than 55° with a slightly roughened polytetrafluoroethylene resin surface. Spiral stripes of the resulting formulation were applied at room temperature to wire insulated with polytetrafluoroethylene and then subjected to a temperature of 685° C. for various times. The marks were of good uniformity and definition. Further results are given in Table I, in which these samples are designated by the letter B.

*Table I*

| Seconds Exposure Time | Abrasion Resistance | |
|---|---|---|
| | Samples A | Samples B |
| 6.75 | 30 | 20 |
| 7.2 | 45 | 20 |
| 9.0 | 105 | 30 |
| 10.8 | 185 | 55 |
| 12 | 235 | 80 |
| 13.5 | 290 | 110 |
| 15.4 | ¹ 350 | ¹ 150 |

¹ Wire damaged.

EXAMPLE IV

Stripes of each of the formulations of Examples I and III were applied at room temperature to wire insulated with a perfluorocarbon resin having a crystalline melting point of about 285° C. and then subjected to a temperature of 610° C. for various times. Marks of good uniformity and definition were obtained. Further results are given in Table II, in which the stripes of the formulation of Example I are designated A, and those of the formulations of Example III are designated B.

*Table II*

| Seconds Exposure Time | Abrasion Resistance | |
|---|---|---|
| | Samples A | Samples B |
| 7.2 | 50 | 9 |
| 8.8 | 55 | 12 |
| 10.4 | 60 | 16 |
| 12 | 66 | 20 |
| 13.6 | 71 | 24 |

I claim:

1. The method of marking a continuous perfluorocarbon resin surface which comprises applying to said surface an ink formulation consisting essentially of heat-resistant pigment, codispersed with at least an equal weight of an hexafluoropropylene/tetrafluoroethylene interpolymer having a crystalline melting point in the range of 242 to 305° C., in a volatile liquid medium which forms a contact angle in the range of 10 to 55° with said perfluorocarbon resin surface, and heating the applied formulation at a temperature of 450 to 950° C. for a time in the range of 2.5 to 32 seconds until an abrasion-resistant mark is obtained.

2. A method of marking a continuous surface of polytetrafluoroethylene resin which comprises applying to said surface an ink formulation consisting essentially of heat-resistant pigment codispersed in liquid tetrachloroethylene with at least an equal weight of an hexafluoropropylene/tetrafluoroethylene resin having a crystalline melting point in the range of 242 to 305° C., and heating the applied formulation at a temperature in the range of 450° C. to 950° C. for a time in seconds, the logarithm of which is in the range of from 1.8952 minus 0.001422T to 2.1937 minus 0.00153T, where T is the temperature of said heating in ° C.

References Cited in the file of this patent

UNITED STATES PATENTS 2,549,935    Sauer    Apr. 24, 1951
2,764,506    Piccard    Sept. 25, 1956